United States Patent
Pieron et al.

(10) Patent No.: US 10,987,581 B2
(45) Date of Patent: *Apr. 27, 2021

(54) SYSTEM AND METHOD FOR ROTATING DROP RATES IN A MYSTERY BOX

(71) Applicant: Kabam, Inc., San Frncisco, CA (US)

(72) Inventors: Luc Pieron, San Francisco, CA (US); Thomas Baxter, Millbrae, CA (US); Henry Rull, Concord, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,773

(22) Filed: May 29, 2019

(65) Prior Publication Data

US 2019/0275422 A1 Sep. 12, 2019

Related U.S. Application Data

(63) Continuation of application No. 14/297,368, filed on Jun. 5, 2014, now Pat. No. 10,307,666.

(51) Int. Cl.
*A63F 13/45* (2014.01)
*A63F 13/69* (2014.01)
(Continued)

(52) U.S. Cl.
CPC ........... *A63F 13/45* (2014.09); *A63F 13/12* (2013.01); *A63F 13/69* (2014.09);
(Continued)

(58) Field of Classification Search
CPC .......... A63F 13/35; A63F 13/69; A63F 13/45
See application file for complete search history.

(56) References Cited

U.S. PATENT DOCUMENTS 5,816,918 A 10/1998 Kelly
5,933,813 A 8/1999 Teicher
(Continued)

FOREIGN PATENT DOCUMENTS

KR 1020130137431 12/2013
WO 2002026333 1/2002
(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.

(Continued)

*Primary Examiner* — Kang Hu
*Assistant Examiner* — Thomas H Henry
(74) *Attorney, Agent, or Firm* — Esplin & Associates, P.C.

(57) ABSTRACT

A system and method configured to enhance gameplay between users in an online game and to provide enhanced interest in virtual goods associated with collections of virtual goods through the ability to rotate drop rates associated with these virtual goods from time to time. The system and method includes the provision of functionality which allows providers of online games to periodically rotate drop rates associated with mystery boxes in order to maintain and/or generate additional interest in specific mystery boxes. As a result, it is possible for game operators to enhance revenue (Continued)

opportunities associated with these boxes even in the case where such boxes have been available for a relatively lengthy period of time and/or where players would have otherwise lost interest in specific boxes.

22 Claims, 2 Drawing Sheets

(51) Int. Cl.
    *A63F 13/30*     (2014.01)
    *G06Q 30/06*     (2012.01)
    *G06Q 30/02*     (2012.01)
    *A63F 13/35*     (2014.01)
    *G06Q 30/00*     (2012.01)

(52) U.S. Cl.
    CPC ..... *G06Q 30/0209* (2013.01); *G06Q 30/0641* (2013.01); *A63F 13/35* (2014.09); *G06Q 30/00* (2013.01); *G06Q 30/02* (2013.01)

(56) References Cited

U.S. PATENT DOCUMENTS

| | | | |
|---|---|---|---|
| 5,964,660 A | 10/1999 | James | |
| 6,015,344 A | 1/2000 | Kelly | |
| 6,142,472 A | 11/2000 | Kliebisch | |
| 6,190,225 B1 | 2/2001 | Coleman | |
| 6,190,255 B1 | 2/2001 | Thomas | |
| 6,193,606 B1 | 2/2001 | Walker | |
| 6,347,996 B1 | 2/2002 | Gilmore | |
| 6,402,619 B1 | 6/2002 | Sato | |
| 6,511,068 B1 | 1/2003 | Sklansky | |
| 6,561,904 B2 | 5/2003 | Locke | |
| 6,604,008 B2 | 8/2003 | Chudley | |
| 6,745,236 B1 | 6/2004 | Hawkins | |
| 6,811,483 B1 | 11/2004 | Webb | |
| 6,850,900 B1 | 2/2005 | Hare | |
| 6,857,959 B1 | 2/2005 | Nguyen | |
| 6,928,474 B2 | 8/2005 | Venkatesan | |
| 7,076,453 B2 | 7/2006 | Jammes | |
| 7,288,028 B2 | 10/2007 | Rodriquez | |
| 7,381,133 B2 | 6/2008 | Thomas | |
| 7,533,336 B2 | 5/2009 | Jaffe | |
| 7,660,740 B2 | 2/2010 | Boone | |
| 7,682,239 B2 | 3/2010 | Friedman | |
| 7,785,188 B2 | 8/2010 | Cannon | |
| 7,813,821 B1 | 10/2010 | Howell | |
| 7,819,749 B1 | 10/2010 | Fish | |
| 7,945,802 B2 | 5/2011 | Hamilton, II | |
| 7,959,507 B2 | 6/2011 | Cannon | |
| 8,010,404 B1 | 8/2011 | Wu | |
| 8,016,668 B2 | 9/2011 | Hardy | |
| 8,047,909 B2 | 11/2011 | Walker | |
| 8,057,294 B2 | 11/2011 | Pacey | |
| 8,066,571 B2 | 11/2011 | Koster | |
| 8,147,340 B2 | 4/2012 | BrunetdeCourssou | |
| 8,157,635 B2 | 4/2012 | Hardy | |
| 8,187,101 B2 | 5/2012 | Herrmann | |
| 8,226,472 B2 | 7/2012 | Van Luchene | |
| 8,231,453 B2 | 7/2012 | Wolf | |
| 8,231,470 B2 | 7/2012 | Feeney | |
| 8,239,487 B1 | 8/2012 | Hoffman | |
| 8,246,439 B2 | 8/2012 | Kelly | |
| 8,272,934 B2 | 9/2012 | Olive | |
| 8,272,951 B2 | 9/2012 | Ganz | |
| 8,272,956 B2 | 9/2012 | Kelly | |
| 8,282,491 B2 | 10/2012 | Auterio | |
| 8,287,367 B2 | 10/2012 | Hall | |
| 8,287,383 B1 | 10/2012 | Etter | |
| 8,287,384 B2 | 10/2012 | Auterio | |
| 8,292,743 B1 | 10/2012 | Etter | |
| 8,313,372 B2 | 11/2012 | Naicker | |
| 8,317,584 B2 | 11/2012 | Aoki | |
| 8,317,601 B1 | 11/2012 | Luciano, Jr. | |
| 8,323,110 B2 | 12/2012 | Shibamiya | |
| 8,328,642 B2 | 12/2012 | Mosites | |
| 8,332,260 B1 | 12/2012 | Mysen | |
| 8,332,544 B1 | 12/2012 | Ralls | |
| 8,348,716 B2 | 1/2013 | Ganz | |
| 8,348,762 B2 | 1/2013 | Willis | |
| 8,348,767 B2 | 1/2013 | Mahajan | |
| 8,348,768 B2 | 1/2013 | Auterio | |
| 8,360,858 B2 | 1/2013 | LaRocca | |
| 8,360,867 B2 | 1/2013 | VanLuchene | |
| 8,360,868 B2 | 1/2013 | Shvili | |
| 8,366,544 B2 | 2/2013 | Walker | |
| 8,366,550 B2 | 2/2013 | Herrmann | |
| 8,371,925 B2 | 2/2013 | Bonney | |
| 8,376,826 B2 | 2/2013 | Katz | |
| 8,382,572 B2 | 2/2013 | Hoffman | |
| 8,388,427 B2 | 3/2013 | Yariv | |
| 8,401,913 B2 | 3/2013 | Alivandi | |
| 8,408,989 B2 | 4/2013 | Bennett | |
| 8,439,759 B1 | 5/2013 | Mello | |
| 8,475,262 B2 | 7/2013 | Wolf | |
| 8,506,394 B2 | 8/2013 | Kelly | |
| 8,512,150 B2 | 8/2013 | Herrmann | |
| 8,583,266 B2 | 11/2013 | Herbrich | |
| 8,636,591 B1 | 1/2014 | Hawk | |
| 8,696,428 B1 | 4/2014 | Post | |
| 8,715,068 B2 | 5/2014 | Arnone | |
| 8,777,754 B1 | 7/2014 | Santini | |
| 8,784,214 B2 | 7/2014 | Parks | |
| 8,790,185 B1 * | 7/2014 | Caldarone | A63F 13/10 463/42 |
| 8,821,260 B1 | 9/2014 | DeSanti | |
| 8,831,758 B1 | 9/2014 | Chu | |
| 8,851,978 B1 | 10/2014 | Koh | |
| 8,920,243 B1 | 12/2014 | Curtis | |
| 8,961,319 B1 | 2/2015 | Pieron | |
| 8,968,067 B1 | 3/2015 | Curtis | |
| 9,138,639 B1 | 9/2015 | Ernst | |
| 9,218,714 B2 | 12/2015 | Arnone | |
| 9,257,007 B2 | 2/2016 | Santini | |
| 9,717,986 B1 | 8/2017 | Kawaguchi | |
| 9,737,819 B2 | 8/2017 | Desanti | |
| 1,038,413 A1 | 8/2019 | Caldarone | |
| 10,456,689 B2 | 10/2019 | Pieron | |
| 10,482,713 B1 | 11/2019 | Schultz | |
| 2002/0059397 A1 | 5/2002 | Feola | |
| 2002/0072412 A1 | 6/2002 | Young | |
| 2002/0094863 A1 | 7/2002 | Klayh | |
| 2002/0095327 A1 | 7/2002 | Zumel | |
| 2002/0115488 A1 | 8/2002 | Berry | |
| 2002/0119824 A1 | 8/2002 | Allen | |
| 2002/0151351 A1 | 10/2002 | Baerlocher | |
| 2002/0165794 A1 | 11/2002 | Ishihara | |
| 2002/0183105 A1 | 12/2002 | Cannon | |
| 2002/0193162 A1 | 12/2002 | Walker | |
| 2003/0008713 A1 | 1/2003 | Ushiro | |
| 2003/0027619 A1 | 2/2003 | Nicastro | |
| 2003/0032476 A1 | 2/2003 | Walker | |
| 2003/0102625 A1 | 6/2003 | Katz | |
| 2003/0109301 A1 | 6/2003 | Chudley | |
| 2003/0157978 A1 | 8/2003 | Englman | |
| 2003/0171148 A1 | 9/2003 | Weitz | |
| 2003/0174178 A1 | 9/2003 | Hodges | |
| 2003/0190960 A1 | 10/2003 | Jokipii | |
| 2003/0216167 A1 | 11/2003 | Gauselmann | |
| 2004/0002387 A1 | 1/2004 | Grady | |
| 2004/0046800 A1 | 3/2004 | Emerson | |
| 2004/0068451 A1 | 4/2004 | Lenk | |
| 2004/0185932 A1 | 9/2004 | Lombardo | |
| 2004/0215524 A1 | 10/2004 | Parkyn | |
| 2004/0219969 A1 | 11/2004 | Casey | |
| 2004/0224745 A1 | 11/2004 | Bregenzer | |
| 2004/0225387 A1 | 11/2004 | Smith | |
| 2004/0267611 A1 | 12/2004 | Hoerenz | |
| 2005/0096117 A1 | 5/2005 | Katz | |
| 2005/0114223 A1 | 5/2005 | Schneider | |
| 2005/0165686 A1 | 7/2005 | Zack | |
| 2005/0176498 A1 | 8/2005 | Nguyen | |
| 2005/0192087 A1 | 9/2005 | Friedman | |

(56) References Cited

U.S. PATENT DOCUMENTS

| | | |
|---|---|---|
| 2005/0209008 A1 | 9/2005 | Shimizu |
| 2005/0227751 A1 | 10/2005 | Zanelli |
| 2005/0255914 A1 | 11/2005 | McHale |
| 2005/0277474 A1 | 12/2005 | Barry |
| 2006/0030407 A1 | 2/2006 | Thayer |
| 2006/0063587 A1 | 3/2006 | Manzo |
| 2006/0116196 A1 | 6/2006 | Vancura |
| 2006/0155597 A1 | 7/2006 | Gleason |
| 2006/0200370 A1 | 9/2006 | Ratliff |
| 2006/0217198 A1 | 9/2006 | Johnson |
| 2006/0287029 A1 | 12/2006 | Yoshinobu |
| 2006/0287102 A1 | 12/2006 | White |
| 2007/0021213 A1 | 1/2007 | Foe |
| 2007/0060314 A1 | 3/2007 | Baerlocher |
| 2007/0060315 A1 | 3/2007 | Park |
| 2007/0077988 A1 | 4/2007 | Friedman |
| 2007/0111770 A1 | 5/2007 | Van Luchene |
| 2007/0129139 A1 | 6/2007 | Nguyen |
| 2007/0129147 A1 | 6/2007 | Gagner |
| 2007/0167235 A1 | 7/2007 | Naicker |
| 2007/0167239 A1 | 7/2007 | ORourke |
| 2007/0191101 A1 | 8/2007 | Coliz |
| 2007/0191102 A1 | 8/2007 | Coliz |
| 2007/0213116 A1 | 9/2007 | Crawford |
| 2007/0281285 A1 | 12/2007 | Jayaweera |
| 2007/0287523 A1 | 12/2007 | Esses |
| 2008/0009344 A1 | 1/2008 | Graham |
| 2008/0015006 A1 | 1/2008 | George |
| 2008/0032787 A1 | 2/2008 | Low |
| 2008/0058092 A1 | 3/2008 | Schwartz |
| 2008/0113706 A1 | 5/2008 | OHalloran |
| 2008/0113815 A1 | 5/2008 | Weingardt |
| 2008/0124353 A1 | 5/2008 | Brodeur |
| 2008/0154798 A1 | 6/2008 | Valz |
| 2008/0171599 A1 | 7/2008 | Salo |
| 2008/0176625 A1 | 7/2008 | Kelly |
| 2008/0194318 A1 | 8/2008 | Kralicky |
| 2008/0200260 A1 | 8/2008 | Deng |
| 2008/0207306 A1 | 8/2008 | Higbie |
| 2008/0214295 A1 | 9/2008 | Dabrowski |
| 2008/0227525 A1 | 9/2008 | Kelly |
| 2008/0234043 A1 | 9/2008 | McCaskey |
| 2008/0242421 A1 | 10/2008 | Geisner |
| 2008/0248867 A1 | 10/2008 | Englman |
| 2008/0275786 A1 | 11/2008 | Gluck |
| 2008/0300045 A1 | 12/2008 | Ratcliff |
| 2008/0318668 A1 | 12/2008 | Ching |
| 2009/0011812 A1 | 1/2009 | Katz |
| 2009/0017886 A1 | 1/2009 | McGucken |
| 2009/0036199 A1 | 2/2009 | Myus |
| 2009/0048918 A1 | 2/2009 | Dawson |
| 2009/0061982 A1 | 3/2009 | Brito |
| 2009/0124353 A1 | 5/2009 | Collette |
| 2009/0143137 A1 | 6/2009 | Asano |
| 2009/0181774 A1 | 7/2009 | Ratcliff |
| 2009/0204907 A1 | 8/2009 | Finn |
| 2009/0210301 A1 | 8/2009 | Porter |
| 2009/0234710 A1 | 9/2009 | Belgaied Hassine |
| 2009/0315893 A1 | 12/2009 | Smith |
| 2010/0004048 A1 | 1/2010 | Brito |
| 2010/0022307 A1 | 1/2010 | Steuer |
| 2010/0035689 A1 | 2/2010 | Altshuler |
| 2010/0041472 A1 | 2/2010 | Gagner |
| 2010/0041481 A1 | 2/2010 | Smedley |
| 2010/0050088 A1 | 2/2010 | Neustaedter |
| 2010/0070056 A1 | 3/2010 | Coronel |
| 2010/0094841 A1 | 4/2010 | Bardwil |
| 2010/0099471 A1 | 4/2010 | Feeney |
| 2010/0107214 A1 | 4/2010 | Ganz |
| 2010/0113162 A1 | 5/2010 | Vemuri |
| 2010/0174593 A1 | 7/2010 | Cao |
| 2010/0198653 A1 | 8/2010 | Bromenshenkel |
| 2010/0210356 A1 | 8/2010 | Losica |
| 2010/0227675 A1 | 9/2010 | Luxton |
| 2010/0227682 A1 | 9/2010 | Reville |
| 2010/0228606 A1 | 9/2010 | Walker |
| 2010/0240444 A1 | 9/2010 | Friedman |
| 2010/0241491 A1 | 9/2010 | Eglen |
| 2010/0241492 A1 | 9/2010 | Eglen |
| 2010/0306015 A1 | 12/2010 | Kingston |
| 2011/0065511 A1 | 3/2011 | Mahan |
| 2011/0092271 A1 | 4/2011 | Nguyen |
| 2011/0092273 A1 | 4/2011 | Cerbini |
| 2011/0111841 A1 | 5/2011 | Tessmer |
| 2011/0112662 A1 | 5/2011 | Thompson |
| 2011/0113353 A1 | 5/2011 | Koh |
| 2011/0118002 A1 | 5/2011 | Aoki |
| 2011/0145040 A1 | 6/2011 | Zahn |
| 2011/0151957 A1 | 6/2011 | Falciglia |
| 2011/0218033 A1 | 9/2011 | Englman |
| 2011/0227919 A1 | 9/2011 | Bongio |
| 2011/0256921 A1 | 10/2011 | Pacey |
| 2011/0256936 A1 | 10/2011 | Walker |
| 2011/0263324 A1 | 10/2011 | Ganetakos |
| 2011/0275438 A9 | 11/2011 | Hardy |
| 2011/0281638 A1 | 11/2011 | Bansi |
| 2011/0281654 A1 | 11/2011 | Kelly |
| 2011/0282764 A1* | 11/2011 | Borst ................. G06Q 30/0641 705/27.1 |
| 2011/0294558 A1 | 12/2011 | Gijin |
| 2011/0300923 A1 | 12/2011 | VanLuchene |
| 2011/0319152 A1 | 12/2011 | Ross |
| 2011/0319170 A1 | 12/2011 | Shimura |
| 2012/0011002 A1 | 1/2012 | Crowe |
| 2012/0015714 A1 | 1/2012 | Ocko |
| 2012/0015715 A1 | 1/2012 | Luxton |
| 2012/0034961 A1 | 2/2012 | Berman |
| 2012/0034973 A1 | 2/2012 | Frank |
| 2012/0040743 A1 | 2/2012 | Auterio |
| 2012/0040761 A1 | 2/2012 | Auterio |
| 2012/0042282 A1 | 2/2012 | Wong |
| 2012/0047002 A1 | 2/2012 | Patel |
| 2012/0059730 A1 | 3/2012 | Jensen |
| 2012/0083909 A1 | 4/2012 | Carpenter |
| 2012/0094743 A1 | 4/2012 | Odom |
| 2012/0101886 A1 | 4/2012 | Subramanian |
| 2012/0108306 A1 | 5/2012 | Munsell |
| 2012/0109785 A1 | 5/2012 | Karlsson |
| 2012/0115593 A1 | 5/2012 | Vann |
| 2012/0122589 A1 | 5/2012 | Kelly |
| 2012/0129590 A1 | 5/2012 | Morrisroe |
| 2012/0130856 A1 | 5/2012 | Petri |
| 2012/0142429 A1 | 6/2012 | Muller |
| 2012/0156668 A1 | 6/2012 | Zelin |
| 2012/0157187 A1 | 6/2012 | Moshal |
| 2012/0157193 A1 | 6/2012 | Arezina |
| 2012/0166380 A1 | 6/2012 | Sridharan |
| 2012/0166449 A1 | 6/2012 | Pitaliya |
| 2012/0178514 A1 | 7/2012 | Schulzke |
| 2012/0178515 A1 | 7/2012 | Adams |
| 2012/0178529 A1 | 7/2012 | Collard |
| 2012/0197874 A1 | 8/2012 | Zatkin |
| 2012/0202570 A1 | 8/2012 | Schwartz |
| 2012/0203669 A1 | 8/2012 | Borsch |
| 2012/0215667 A1 | 8/2012 | Ganz |
| 2012/0221430 A1 | 8/2012 | Naghmouchi |
| 2012/0226573 A1 | 9/2012 | Zakas |
| 2012/0231891 A1 | 9/2012 | Watkins |
| 2012/0244945 A1 | 9/2012 | Kolo |
| 2012/0244947 A1 | 9/2012 | Ehrlich |
| 2012/0244950 A1 | 9/2012 | Braun |
| 2012/0245988 A1 | 9/2012 | Pace |
| 2012/0256377 A1 | 10/2012 | Schneider |
| 2012/0282986 A1 | 11/2012 | Castro |
| 2012/0283013 A1 | 11/2012 | Guo |
| 2012/0289315 A1 | 11/2012 | Van Luchene |
| 2012/0289330 A1 | 11/2012 | Leydon |
| 2012/0289346 A1 | 11/2012 | VanLuchene |
| 2012/0295699 A1 | 11/2012 | Reiche |
| 2012/0296716 A1 | 11/2012 | Barbeau |
| 2012/0302329 A1 | 11/2012 | Katz |
| 2012/0302335 A1 | 11/2012 | Gregory-Brown |
| 2012/0309504 A1 | 12/2012 | Isozaki |
| 2012/0311504 A1 | 12/2012 | van Os |

(56) References Cited

U.S. PATENT DOCUMENTS

| | | |
|---|---|---|
| 2012/0322545 A1 | 12/2012 | Arnone |
| 2012/0322561 A1 | 12/2012 | Kohlhoff |
| 2012/0330785 A1 | 12/2012 | Hamick |
| 2013/0005437 A1 | 1/2013 | Bethke |
| 2013/0005438 A1 | 1/2013 | Ocko |
| 2013/0005466 A1 | 1/2013 | Mahajan |
| 2013/0005473 A1 | 1/2013 | Bethke |
| 2013/0005475 A1 | 1/2013 | Mahajan |
| 2013/0005480 A1 | 1/2013 | Bethke |
| 2013/0006735 A1 | 1/2013 | Koenigsberg |
| 2013/0006736 A1 | 1/2013 | Bethke |
| 2013/0012304 A1 | 1/2013 | Cartwright |
| 2013/0013094 A1 | 1/2013 | Parks |
| 2013/0013326 A1 | 1/2013 | Miller |
| 2013/0013404 A1 | 1/2013 | Suprock |
| 2013/0013459 A1 | 1/2013 | Kerr |
| 2013/0029745 A1 | 1/2013 | Kelly |
| 2013/0059656 A1 | 3/2013 | Kim |
| 2013/0072278 A1 | 3/2013 | Salazar |
| 2013/0079087 A1 | 3/2013 | Brosnan |
| 2013/0090173 A1 | 4/2013 | Kislyi |
| 2013/0090750 A1 | 4/2013 | Herrman |
| 2013/0095914 A1 | 4/2013 | Allen |
| 2013/0123005 A1 | 5/2013 | Allen |
| 2013/0124361 A1 | 5/2013 | Bryson |
| 2013/0151342 A1 | 6/2013 | Citron |
| 2013/0173393 A1 | 7/2013 | Calman |
| 2013/0178259 A1 | 7/2013 | Strause |
| 2013/0210511 A1 | 8/2013 | LaRocca |
| 2013/0217489 A1 | 8/2013 | Bronstein Bendayan |
| 2013/0226733 A1 | 8/2013 | Evans |
| 2013/0237299 A1 | 9/2013 | Bancel |
| 2013/0244767 A1 | 9/2013 | Barclay |
| 2013/0288757 A1 | 10/2013 | Guthridge |
| 2013/0290147 A1 | 10/2013 | Chandra |
| 2013/0303276 A1 | 11/2013 | Weston |
| 2013/0310164 A1 | 11/2013 | Walker |
| 2013/0344932 A1 | 12/2013 | Adams |
| 2014/0004884 A1 | 1/2014 | Chang |
| 2014/0018156 A1 | 1/2014 | Rizzotti |
| 2014/0033262 A1 | 1/2014 | Anders |
| 2014/0038679 A1 | 2/2014 | Snow |
| 2014/0067526 A1 | 3/2014 | Raju |
| 2014/0067544 A1 | 3/2014 | Klish |
| 2014/0073434 A1 | 3/2014 | Yukishita |
| 2014/0073436 A1 | 3/2014 | Takagi |
| 2014/0087864 A1 | 3/2014 | Togashi |
| 2014/0089048 A1 | 3/2014 | Bruich |
| 2014/0100020 A1 | 4/2014 | Carroll |
| 2014/0106858 A1 | 4/2014 | Constable |
| 2014/0128137 A1 | 5/2014 | Balise |
| 2014/0157314 A1 | 6/2014 | Roberts |
| 2014/0206452 A1 | 7/2014 | Bambino |
| 2014/0243072 A1 | 8/2014 | Santini |
| 2014/0274359 A1 | 9/2014 | Helava |
| 2014/0295958 A1 | 10/2014 | Shono |
| 2014/0315616 A1 | 10/2014 | Avin |
| 2014/0329585 A1 | 11/2014 | Santini |
| 2014/0337259 A1 | 11/2014 | Lamb |
| 2015/0011286 A1 | 1/2015 | Kim |
| 2015/0019349 A1 | 1/2015 | Milley |
| 2015/0031440 A1 | 1/2015 | Desanti |
| 2015/0065243 A1 | 3/2015 | Mizrahi |
| 2015/0087378 A1 | 3/2015 | Louie |
| 2015/0126269 A1 | 5/2015 | Linden |
| 2015/0141118 A1 | 5/2015 | Lefebvre |
| 2015/0306494 A1 | 10/2015 | Pieron |
| 2015/0335995 A1 | 11/2015 | McLellan |
| 2015/0352436 A1 | 12/2015 | Pieron |
| 2016/0110903 A1 | 4/2016 | Perrin |
| 2018/0353846 A1 | 12/2018 | Nowak |
| 2019/0143219 A1 | 5/2019 | Kawaguchi |

FOREIGN PATENT DOCUMENTS

| | | |
|---|---|---|
| WO | 2013013281 | 1/2013 |
| WO | 2013059639 | 1/2013 |
| WO | 2015013373 | 1/2015 |
| WO | 2015168187 | 11/2015 |
| WO | 2015179450 | 11/2015 |
| WO | 2015196105 | 12/2015 |

OTHER PUBLICATIONS

"Behavioural Analytics & Campaigning", http://lotaris.com/behavioural._analytics_and._Campaigning.htm, screenshot access date May 24, 2012 2:21 PM, 1 page.

"Building Structures". War2.warcraft.org. Online. Accessed via the Internet. Accessed Aug. 9, 2014. <URL: http://war2.warcraft.org/strategy/verybasics/building.shtml>, 3 pages.

"Cataclysm Guide: Guild Advancement—Wowhead", http://www.wowhead.com/guide=cataclysm&guilds, printed Dec. 5, 2013, 4 pages.

"Clash of Clans". Wikipedia.org. Online. Accessed via the Internet. Accessed Aug. 9, 2014. <URL: http://en.wikipedia.org/wiki/Clash of Clans>, 3 pages.

"Digital River World Payments and Lotaris Partner to Extend Mobile Application Licensing and Monetization Capabilities to Software Publishers", Business Wire Press Release, http://www.marketwatch.com/story/digital-river-world-payments-and-lotaris . . . , posted San Francisco, Mar. 27, 2012 (Business Wire), 8:30 a.m. EDT, printed May 24, 2012 2:32 PM, 3 pages.

"Digital River World Payments and Lotaris Partner to Extend Mobile Application Licensing and Monetization Capabilities to Software Publishers", Lotaris Press Release, http://www.lotaris.com/digital_river_world_payments_and_lotaris_partne . . . , posted Tuesday, Mar. 27, 2012, screenshop access date May 24, 2012, 2:19 PM, 1 page.

"Gem calculation formulas", forum.supercell.net. Online. Accessed via the Internet. Accessed Aug. 9, 2014. <URL: http://forum.supercell.net/showthread.php/23028-Gem-calculation-formulas>, 3 pages.

"Getting Started" written by BoD, published on Oct. 13, 2011 and printed from URL <http://lotrowiki.com/index.php?title=Getting_Started&oldid=349681 >, 5 pages.

"Guild Housing System—FlyFF Wiki", http://flyff-wiki.gpotato.com/wiki/Guild_Housing_System, printed Dec. 5, 2013, 5 pages.

"How Town Hall to Level 4". Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

"I don't have enough resources/builders to upgrade anything in my village, what can I do?" gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-l-do->, Apr. 23, 2014, 9 pages.

"Kabam Community Forums > Kingdoms of Camelot > Kingdoms of Camelot Open Discussion > Open Discussion : Tournament of Might Prizes / Main Discussion thread", printed from http://community.kabam.com/forums/archive/index.php/t-43273.html, Oct. 24, 2011, 23 pages.

"Lotro Store" written by Elinnea, published on Dec. 15, 2011 and printed from URL <http://lotrowiki.com/index.php ?title=LOTRO_Store&oldid=396550>, 23 pages.

"Lotro-Wiki.com" (evidence in regards to "Lord of the Rings Online" MMORPG game), latest Dec. 22, 2011, <http://lotrowiki.com/index.php/Main_Page), http://lotro-wiki.com/index.php?title=LOTRO_Store&oldid=396550, http://lotro-wiki.com/index.php?title=Quest:A_Little_Extra_Never_Hurts_--_Part_1&oldid=399597, Links are to used articles, 28 pages.

"Lotro-Wiki.com" (evidence in regards to "Lord of the Rings Online" MMORPG game), latest Dec. 22, 2011, http://lotro-wiki.com/index.php/Main_Page) (http://lotro-wiki.com/index.php?title=LOTRO_Store&oldid=396550, http://lotro-wiki.com/index.php?

(56) References Cited

OTHER PUBLICATIONS title=Quest:A_Little_Extra_Never_Hurts_--_Part_1&oldid=399597, http://lotro-wiki.com/index.php?title=Quest:A_Little_Extra_Never_Hurts_--_Part_2&oldid=399366, http://lotro-wiki.com/index.php?title=Getting_Started&oldid=349681, Links are to used articles, 33 pages.

"Main Page" written by Starbusty, published on Dec. 12, 2011 and printed from URL <http://lotrowiki.com/index.php?title=Main_Page&oldid=394429>, 2 pages.

"Quest: A Little Extra Never Hurts—Part 1" written by Zimoon, published on Dec. 22, 2011 and printed from URL <http://lotro-wiki.com/index.php?title=Quest:A_Little_Extra_Never_Hurts_--_Part_1&oldid=399597>, 3 pages.

"Quest: A Little Extra Never Hurts—Part 2" written by Zimoon, published on Dec. 21, 2011 and printed from URL <http://lotro-wiki.com/index.php?title=Quest:A_Little_Extra_Never_Hurts_--_Part_2&oldid=399366>, 2 pages.

"Rest—WoWWiki—Your guide to the World of Warcraft", printed from http://www.wowwiki.com/Rest, May 19, 2014, 2 pages.

"Treasure Chest Game" written by Zelda Wiki, the Zelda encyclopedia; published on or before Oct. 17, 2012; accessible andprinted from URL <http://web.archive.org/web/20121017085058/http://zeldawiki.org/Treasure_Chest_Game>, 4 pages.

"Warcraft II: Tides of Darkness". Wikipedia.org. Online. Accessed via the Internet. Accessed Aug. 9, 2014. <URL: http://en.wikipedia.org/wiki/Warcraft_II:_Tides_of_Darkness>, 10 pages.

<http://lotro-wiki.com/index.php?title=Ouest:A_Little_Extra_Never_Hurts_--_Part_2&oldid=399366>, <http://lotrowiki.com/index.php?title=Getting_ Started&oldid=349681 >. Links are to used articles. (7 pgs) Feb. 26, 2014.

City Coins. CityVille Wikia. Online. Accessed via the Internet. Accessed Aug. 9, 2014. <URL: http://cityville.wikia.com/wiki/City_Coins>, 2 pages.

Diablo 2, Blizzard Entertainment, Mar. 23, 2009, manual and on line website http://web.archive.org/web/20090323171356/http://classic.battle.net/diablo2exp/items/basics.shtml (4 pages).

Diablo 2, Blizzard Entertainment, Mar. 23, 2009, manual and online website, http://web.archive.Org/web/20090323171356/http://classic.battle.net/diablo 2exp/items/basics.shtml, 51 pages.

Dreamslayer's Enchanting and Upgrading Guide—With Pictures:D and Explanations, URL: forums.elswordonline.com/Topic5673.aspx [Retrieved Feb. 21, 2013], 8 pages.

Elsword—Wikipedia, the free encyclopedia, URL: en.wikipedia.org/wiki/Elsword [Retrieved Feb. 21, 2013], 6 pages.

Elsword, Dec. 27, 2007, KOG Studios, guide posted Mar. 17, 2011 https://web.arch ive.org/web/20110509033123/http ://forums. elswordon I ine.com/Topic5673.aspx, http://en.wikipedia.org/wiki/Elsword (9 pages).

Elsword, Dec. 27, 2007, KOG Studios, Guide posted Mar. 17, 2011, http://forums.elswordonline.com/topic5673.aspx, http://en.wikipedia.org/wiki/Elsword, 16 pages.

FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.

Gaia "Black Friday Bundle" available on Nov. 23, 2011, from http://www.gaiaonline.com/forum/community-announcements/black-friday-big-bundles-rare-items/t.76127933/, 5 pages.

Gem System—Street Fighter X Tekken, http://www.streetfighter.com/us/sfxtk/features/gem-system, printed Nov. 6, 2012, 6 pages.

Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1-14-29-Hamari,Lehdonvirta.pdf, on May 26, 2015, 16 pages.

Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.

MapleStory—Guides—Equipment Upgrading 101: Enhancements, URL: maplestory.nexon.net/guides/game-play/systems/OOFlk; [Retrieved Jun. 24, 2013] 3 pages.

MapleStory—Guides—Equipment Upgrading 101: Potentials, URL: maplestory.nexon.net/guides/game-play/systems/OOFlj/ [Retrieved Jun. 24, 2013], 5 pages.

MapleStory—Guides—Equipment Upgrading 101: Scrolls, URL: maplestory.nexon.net/guides/game-play/systems/OOFFV/#mitigating [Retrieved Jun. 24, 2013], 4 pages.

MapleStory, Internet guide: http://maplestory.nexon.net/guides/game-play/systems/00Flk/, http://maplestory.nexon.net/guides/game-play/systems/00Flk, http://maplestory.nexon.net/guides/game-play/systems/00FFV, Sep. 28, 2012, 12 pages.

MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.

New Feature: Tiered Tournaments and Tournament Updates, printed from http://community.kabam.com/forums/showthread.php?171349-New-Feat on Feb. 11, 2014, 2 pages.

Ozeagle, "What happens if . . . answers about account types" on Lotro forum, Jan. 18, 2011,<https://www.lotro.com/forums/showthread.php?377885-What-happens-if-answers-about-the-account-types> (16 pgs).

Path of Exile—Forum—Beta General Discussion—Unique Items Compendium 60/71 URL: web.archive.org/web/20120608004658/http://www.pathofexile.com/foru m/view-thread/12056 [Retrieved Jun. 24, 2013], 52 pages.

Path of Exile, Internet posting: http://web.archive.org/web/20120606004658/http://www.pathofexile.com/forum/view-thread/12056, Nov. 16, 2011, 52 pages.

Profession—WoWWiki—Your guide to the World of Warcraft, URL: http://www.wowwiki.com/Profession, printed Nov. 6, 2012, 8 pages.

Super Mario Bros. 3 Review, Nintendo for NES, Feb. 1990, pp. 1-4.
Super Mario Bros. 3, NES Gameplay, http://www.youtube.com/watch?v=82TL-Acm4ts, Published on Mar. 14, 2009, 1 page.

Super Mario Bros. 3, StrategyWiki, the video game walkthrough and strategy guide, http://strategywiki.org/wiki/Super_Mario_Bros._3, Oct. 2, 2012, 4 pages.

TFF Challenge—UC Davis, http://tffchallenge.com/team/uc-davis/, printed Jan. 15, 2014, 12 pages.

TFWiki "teamfortress wiki" available Nov. 5, 2011 retrieved from https://web.archive.org/web/20111105044256/http://wiki.teamfortress.com/wiki/Loadout, 4 pages.

The Arreat Summit—Items: Basic Item Information, URL: web.archive.org/web/20090323171356/http://classic.battle.net/diablo2exp/items/basics.shtml [Retrieved Feb. 21, 2013], 3 pages.

UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.

Wiki "Gaia online", available on Sep. 9, 2011, https://web.archive.org/web/20110927210155/http://en.wikipedia.org/wiki/Gaia_Online, 8 pages.

Wikipedia, Mafia Wars, <http://en.wikipedia.org/wiki/Mafia_Wars>, Jan. 28, 2012, 3 pages.

Super Mario Bros. 3 Review, The Mean Machines Archives, Nintendo for NES, Feb. 1990, pp. 1-4 (Year: 1990).

* cited by examiner

SYSTEM AND METHOD FOR ROTATING DROP RATES IN A MYSTERY BOX

FIELD OF THE DISCLOSURE

This disclosure relates to providing enhanced interest in game play particularly with respect to purchasable virtual items wherein the providers of online games can periodically adjust drop rates associated with these virtual items based on various triggers.

BACKGROUND

Online games may include the ability for players to purchase collections of virtual items that are typically associated with gameplay. These collections may be referred to as "mystery boxes" or other names. Typically, these collections are provided in a random fashion such that a purchasing player will not know what virtual items are included in the collection until after that player makes the purchase and "opens" the box.

Some of the virtual items contained in the collection may be associated with a high value and some items may be associated with less value. For example, items that provide an enhanced competitive benefit in game play may be valued significantly more than items that are non-functional such as badges, costumes, etc. The drop rates/probabilities associated with these items are typically random, provided that high value items in the collection may be specifically limited in occurrence to maintain value.

In many cases when a specific collection/mystery box has been available for a relatively lengthy period of time, players may lose interest in the collection/box for a number of reasons. This may be driven by the fact that players already have the items that they need, that they believe that the drop rates for the items they seek are too low and thus they are unlikely to obtain them and/or for other reasons. When players lose interest in specific mystery box offerings, there is a negative impact to revenue associated with these boxes even though the box and the virtual items contained in the box may remain relevant and/or valuable.

SUMMARY

One aspect of the disclosure relates to a system and method configured to enhance gameplay between users in an online game including the ability to rotate drop rates associated with virtual items contained within collections of virtual items. In some implementations, the system and method include executing an instance of an online game, and using the instance of the online game to facilitate participation by the users in the online game via a client computing devices. Facilitating participation in the online game includes facilitating interaction between game entities associated with and/or controlled by the individual users in the online game as well as interaction within the gaming environment.

The system and method includes the provision of functionality which allows providers of online games to periodically rotate drop rates associated with mystery boxes in order to maintain and/or generate additional interest in specific mystery boxes. As a result, it is possible for game operators to enhance revenue opportunities associated with these boxes even in the case where such boxes have been available for a relatively lengthy period of time and/or where players would have otherwise lost interest in specific boxes.

In some implementations, the system and method allow for an administrator and/or an individual associated with a live operations team of a game provider to preset and periodically modify drop rate rotations associated with groupings of virtual items such as with mystery boxes and also with specific virtual items contained within those groupings. Drop rates may be modified from time to time to generate enhanced interest in mystery boxes and other groupings of virtual items which are made available for sale.

In exemplary implementations, the system and method provides for drop rates associated with virtual items to be modified based on one or more "triggers" associated with a specific player, set of players or across all players of the game. When these triggers are met, the system then makes a change to drop rates associated with one or more virtual items which are available for purchase.

In some implementations, triggers may include an individual player purchasing a threshold number of mystery boxes in general or an individual purchasing a threshold number of a specific mystery box. In other implementations, a trigger may require a player to hold a threshold number of mystery boxes in that player's virtual goods inventory, or alternatively, hold a threshold number of a specific mystery box or set of mystery boxes in the player's virtual goods inventory. In these cases, if the trigger is met, when the specific player makes a purchase of an applicable mystery box, that player will obtain a different drop rate for one or more of the virtual items in the mystery box. Typically, the different drop rate will comprise an enhanced drop rate such that the player is more likely to obtain a high value virtual item although this is not required.

In other exemplary implementations, triggers may tie to status associated with all players. This may include, for example, the number of a specific mystery box purchased over time by all players (the current "spend velocity" associated with a specific mystery box). In additional implementations, the trigger may comprise spend velocity associated with all available mystery boxes associated with a particular online game. Triggers may also be tied to conditions such as overall game revenue over time and/or overall revenue in a particular game sector or particular category of purchasable items.

In some implementations, players and/or prospective players are notified of changes to drop rates associated with particular mystery boxes so as to encourage such player to purchase these mystery boxes based on, for example, an enhanced drop rate for items desired by players. Changes to drop rates may be permanent or they may be limited in time as determined by the game operator through the use of the system and methodology of the present invention.

In exemplary implementations, enhancing gameplay between users associated with an online game may be performed by processors executing computer program components. In some implementations, the system may include one or more servers. The server(s) may be configured to communicate with one or more client computing platforms according to a client/server architecture. The users may access the system via the client computing platforms, for instance, to engage in game play and/or participate in events such as tournaments.

The server(s) may be configured to execute one or more computer program components to provide one or more games to users (or players). The computer program components may include one or more of a game component, a user component, an shop component, a probability item bundle activation component, a probability adjustment component and/or other components. It is noted that the client computing platforms may include one or more computer program components that are the same as or similar to the computer program components of the server(s) to facilitate individualized content made available to the users of online games.

The game component may be configured to execute an instance of an online game, and to use the instance of the online game to facilitate participation by users in the online game via client computing devices wherein the online game facilitates interactions between game entities associated with and/or controlled by the individual users in the online game and/or interactions between game entities and the gaming environment.

The user component may be configured to maintain inventories of virtual items under the control of the users, and to store associations between the users and virtual items under their control.

The shop component may be configured to effectuate presentation to users, through a shop interface, offers to sell probability item bundles, individual ones of the probability item bundles being associated with sets of potential awards usable in the online game, the probability item bundles including a first probability item bundle being associated with a first set of potential awards, the first set of potential awards including a first individual award and a second individual award. individual awards in the sets of potential awards may be associated with different distribution probabilities such that the first individual award is associated with a first distribution probability and the second individual award is associated with a second distribution probability. Additionally, purchase of probability item bundles by users may result in the addition of purchased probability item bundles to inventories of the users such that responsive to purchase of the first probability item bundle by a first user, the first probability item bundle is added to a first inventory of virtual items under the control of the first user.

The probability item bundle activation component may be configured to receive activation requests from users for probability item bundles under their control, and to stochastically distribute potential awards to the users in accordance with award probabilities associated with the individual awards such that, in response to receiving an activation request from the first user for the first probability item bundle subsequent to purchase of the first probability item bundle by the first user, the probability item bundle activation component is configured to stochastically select one of the individual awards from the first set of potential awards in accordance with the distribution probabilities associated with the individual awards, and to distribute the selected individual award to the first inventory of virtual items under the control of the first user.

The probability adjustment component may be configured to adjust distribution probabilities associated with individual awards included in sets of potential awards in a predetermined manner in response to predetermined triggering criteria being met such that, in response to the predetermined triggering criteria being met subsequent to purchase of the first probability item bundle by the first user, one or both of the first distribution probability and/or the second distribution probability are adjusted in a predetermined manner.

One aspect of the disclosure relates to a computer-implemented method for enhancing gameplay between users in connection with online games, the method being implemented in a computer system that includes one or more physical processors and storage media storing machine-readable instructions. The method may be implemented in a computer system that includes one or more physical processors and storage media storing machine-readable instructions. The method includes executing an instance of an online game. The method further includes implementing the instance of the online game to facilitate participation of the user in the online game. The method further includes maintaining inventories of virtual items under the control of the users, and storing associations between the users and virtual items under their control.

In some implementations, the method includes effectuating presentation to users, through a shop interface, offers to sell probability item bundles, individual ones of the probability item bundles being associated with sets of potential awards usable in the online game, the probability item bundles including a first probability item bundle being associated with a first set of potential awards, the first set of potential awards including a first individual award and a second individual award. Individual awards in the sets of potential awards are associated with different distribution probabilities such that the first individual award is associated with a first distribution probability and the second individual award is associated with a second distribution probability, and purchase of probability item bundles by users results in the addition of purchased probability item bundles to inventories of the users such that responsive to purchase of the first probability item bundle by a first user, the first probability item bundle is added to a first inventory of virtual items under the control of the first user.

The method of the present invention may also include receiving activation requests from users for probability item bundles under their control, and stochastically distributing potential awards to the users in accordance with award probabilities associated with the individual awards such that, in response to receiving an activation request from the first user for the first probability item bundle subsequent to purchase of the first probability item bundle by the first user, stochastically selecting one of the individual awards from the first set of potential awards in accordance with the distribution probabilities associated with the individual awards, and distributing the selected individual award to the first inventory of virtual items under the control of the first user The method of the present invention may also include adjusting distribution probabilities associated with individual awards included in sets of potential awards in a predetermined manner in response to predetermined triggering criteria being met such that, in response to the predetermined triggering criteria being met subsequent to purchase of the first probability item bundle being purchased by the first user, one or both of the first distribution probability and/or the second distribution probability are adjusted in a predetermined manner.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
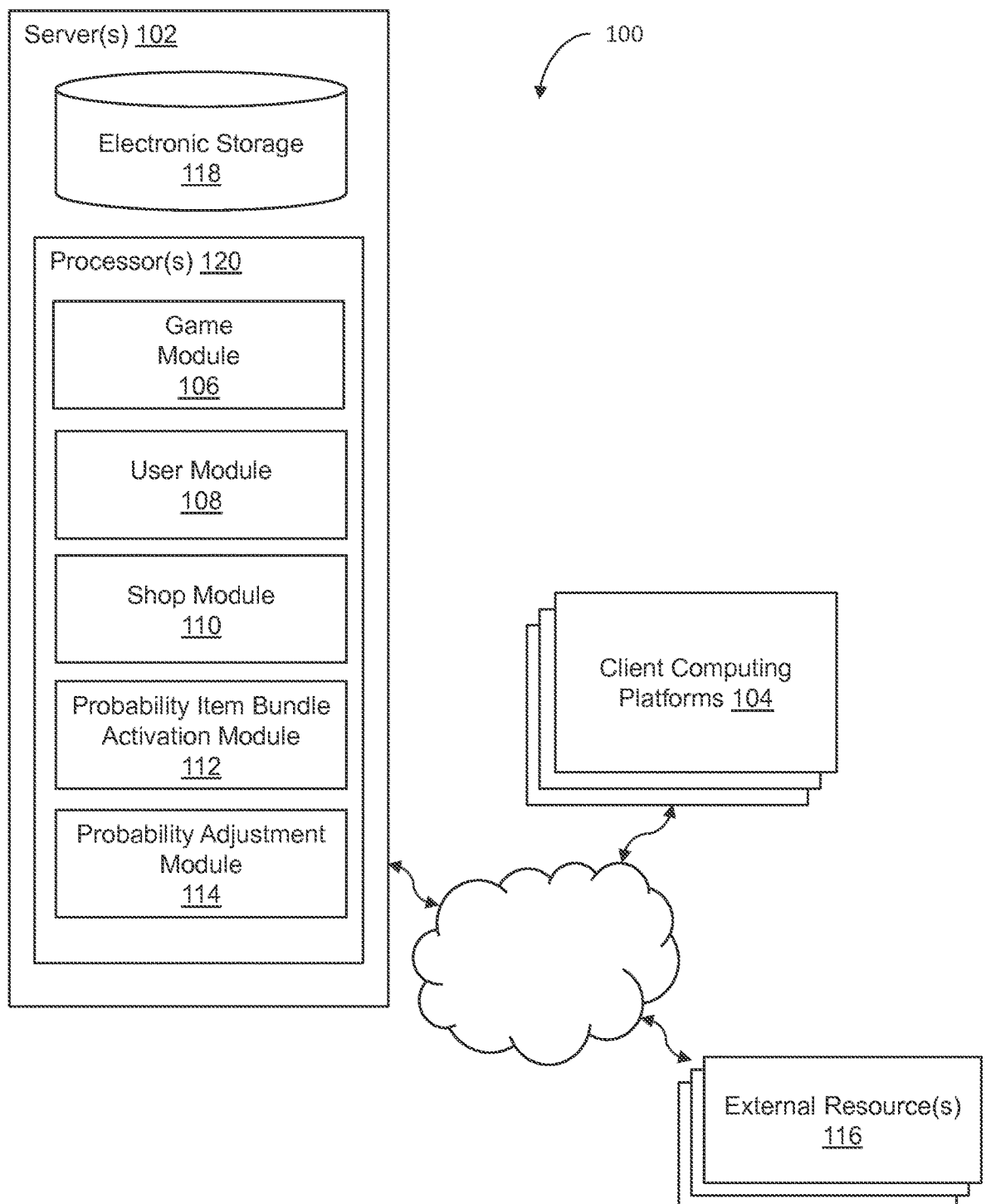
FIG. 1 illustrates a system configured to provide a virtual space and providing enhanced gameplay via adjustable and rotating drop rates associated with virtual goods, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, a system and methodology is provided which enhances the online gaming experience and also provides enhanced revenue opportunities for providers of online games. According to the present invention, a system and methodology is provided in which drop rates associated with virtual items contained in mystery boxes or other collections of virtual goods can be periodically adjusted to as to maintain and increase interest in these collections among users and thus drive increased revenue opportunities for game providers in connection with these collections of virtual goods.

Accordingly, embodiments may be configured such that the system of the present invention facilities the setting of triggers for adjusting drop rates as well as the specific drop rate adjustments to be made when the triggers are achieved. Various triggers may be set through which, if such triggers are achieved, drop rate adjustments will be activated. In some embodiments, the adjustment to drop rates associated with groupings of virtual items, referenced herein as mystery boxes and/or probability item bundles, is made to enhance the chance that a purchaser of the mystery box will actually receive a specific virtual item. Typically, the virtual items desired by users are items which are either rare or provide a significant benefit associated with gameplay, or both.

Embodiments may be configured such that any or all of a set of available triggers may be selected by an administrator or member of a live operations team associated with an online game and implemented along with one or more adjustments to drop rates. In exemplary embodiments, one such trigger may include the number of the specific mystery box(es) previously purchased by a single user. For example, a trigger may be set such that if a single user purchases the third instance of a specific mystery box, then the trigger would be met and a resulting change to drop rate would be activated with respect to that user's inventory of those instances of mystery boxes. Further with respect to this example, a desired item within the mystery box bundle may have its probability of being included in any of the three boxes increased by some preset value. By way of example, prior to the purchase of the third box, the probability of obtaining the desired item might be 5% but once the third box is purchased, such probability might be increased to, for example, 20% in each of the three boxes.

In other exemplary embodiments, other triggers may also and/or alternatively be used. For example, other triggers relating to a specific user/player may be used. This may include a threshold number of boxes in a user's virtual inventory at any point in time. The inventory threshold may be for a specifically designated box (e.g. 6 of box "A" in a single user's inventory), for a specified set of boxes (e.g. 2 of box "A", 3 of box "B" and 5 of box "C") and/or for a total number of boxes of any kind (e.g. 9 total boxes of any kind in a user's inventory).

In some implementations, triggers may be tied to metrics associated with groups of users or all users across a game platform and/or that play a specific online game. Examples of these triggers include total number of boxes purchased by the collective set of users (e.g. 1000 users that play game "A" have purchased a collective total of at least 5000 boxes), a specified set of boxes (e.g. 1000 users that play game "A" have purchased at least 500 of box "X", 200 of box "Y" and 100 of box "Z") or with respect to a specific box (e.g. 1000 users that play game "A" have purchased at least 500 of box "X").

In other exemplary implementations, triggers may be tied to spend velocity with respect to one or more of a particular set of mystery boxes (e.g. 1000 users that play game "A" have spent less than $500 on mystery boxes associated with game "A" over the past month) (e.g. 1000 users that play game "A" have spent less than $500 on mystery boxes associated with game "A" since game "A" was first made available), a particular mystery box (e.g. 1000 users that play game "A" have spent less than $500 on mystery box "X" associated with game "A" over some predetermined timeframe), or a particular game (e.g. 1000 users that play game "A" have spent more than $800 on all game associated purchases over a predetermined timeframe). As will be recognized by one of skill in the art, many other possibilities exist for trigger selection without departing from the scope or spirit of the present invention.

In other exemplary implementations, triggers may be associated with specified timeframes only. In this case, pre-determined adjustments to distribution probabilities for virtual items associated with mystery boxes may be set to be applied only during specified time periods (e.g. Mondays from 11 pm EST to 1 am EST) either without regard for any of the purchase or inventory criteria discussed above and/or in combination with such other triggers.

In exemplary implementations, changes to drop rates may take various forms. For example, these changes may apply an otherwise higher distribution rate to one or more virtual items in the applicable collection of virtual items. As may be determined by a game operator, these changes may apply to specific collections or to all available collections of virtual items so long as the applicable trigger(s) is/are met as discussed above and elsewhere herein.

By way of example, presuming the applicable trigger is met, and presuming that a specific collection of virtual items potentially contains items A, B, C and D. Prior to adjustment, the probabilities of receiving the items might be as follows: A—30%, B—50%, C—2%, and D—75%. In this example, it may be that item C is a highly coveted item and thus the chances for obtaining it are purposely kept low so as to maintain the actual and/or perceived value of the item. If a trigger is met, (e.g. a player purchases the third instance of this collection), the system may adjust probabilities, by way of example, to A—30%, B—50%, C—10%, and D—75%. This adjustment may apply to all three of the purchased collections or only one of the collections (e.g. the last/third purchased collection) as determined by the game operator. In this example, this represents a reward to a player that has purchased multiple of the same collections by giving that person an increased chance of obtaining the desired item C.

Unlimited possibilities exist for the various adjustments including adjusting any or all of the probabilities associated with items A, B, C and/or D either by increasing or decreasing each probability. Probabilities associated with items in collections may be adjusted for all collections (whether previously purchased and in a player's inventory) or only for collections yet to be purchased depending upon the determinations of the game operator so as to encourage the desired behavior of purchasers and potential purchasers.

In some implementations, the system and methodology of the present invention provide for notifying interested users of applicable triggers and/or modifications to drop rates associated with those triggers to promote purchases of these virtual items with the goal of increasing game revenue. These messages may be automatically generated and sent from time to time to include when a trigger is about to be met and/or to show progress against a trigger to further encourage desired behavior. As noted above, any adjustments to drop rates can be limited in time regardless of the specific trigger and/or adjustments to drop rates selected.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program components. The computer program components may include one or more of a game component 106, a user component 108, a shop component 110, a probability item bundle activation component 112, a probability adjustment component 114 and/or other components. As noted, the client computing platform(s) 104 may include one or more computer program components that are the same as or similar to the computer program components of the server(s) 102 to facilitate in-game actions.

The game component 106 may be configured to execute an instance of a game to facilitate presentation of the game to users. The game component 106 may be configured to implement in-game actions in the instance of the game, in response to action requests for the in-game actions by the users.

The game may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms 104. Communications may be routed to and from the appropriate users through server(s) 102. In implementations, the game component 106 may also be configured to implement the delivery of promotional avatars to qualified player in connection with in-game implementation as described herein.

The user component 108 may be configured to maintain inventories of virtual items under the control of the users, and to store associations between the users and virtual items under their control. These virtual items may be purchased and/or otherwise awarded to the users and inventories of such items are maintained by the system of the present invention under the control of user component 108.

Shop component 110 may be configured to effectuate presentation to users, through a shop interface, offers to sell probability item bundles, individual ones of the probability item bundles being associated with sets of potential awards usable in the online game, the probability item bundles including a first probability item bundle being associated with a first set of potential awards, the first set of potential awards including a first individual award and a second individual award. These potential awards comprise virtual items which may be usable in one or more online games and/or have value outside of online gaming. In some embodiments, shop component is configured In some embodiments, individual awards in the sets of potential awards are associated with different distribution probabilities such that the first individual award is associated with a first distribution probability and the second individual award is associated with a second distribution probability. In some embodiments, the purchase of probability item bundles by users results in the addition of purchased probability item bundles to inventories of the users such that responsive to purchase of the first probability item bundle by a first user, the first probability item bundle is added to a first inventory of virtual items under the control of the first user;

In some embodiments, probability item bundle activation component 112 is configured to receive activation requests from users for probability item bundles under their control, and to stochastically distribute potential awards to the users in accordance with award probabilities associated with the individual awards such that, in response to receiving an activation request from the first user for the first probability item bundle subsequent to purchase of the first probability item bundle by the first user, the probability item bundle activation component is configured to stochastically select one of the individual awards from the first set of potential awards in accordance with the distribution probabilities associated with the individual awards, and to distribute the selected individual award to the first inventory of virtual items under the control of the first user In some embodiments, probability adjustment component 114 is configured to adjust distribution probabilities associated with individual awards included in sets of potential awards in a predetermined manner in response to predetermined triggering criteria being met such that, in response to the predetermined triggering criteria being met subsequent to purchase of the first probability item bundle by the first user, one or both of the first distribution probability and/or the second distribution probability are adjusted in a predetermined manner.

As discussed above, when predetermined triggers are met, distribution probabilities associated with one or more virtual items contained in collections of virtual items may be adjusted by probability adjustment component 114 as determined by game operators. Adjustments to probabilities may apply to all items in a collection, subsets of items in a collection or only one item in a collection. By adjusting the probabilities, the chance for an owner of the collection to receive the one or more items in the collection is adjusted. Typically, adjustment will be set to increase the probability of receiving an item or items, although it is also possible to lower probabilities of actually receiving one or more virtual items as well.

Probability adjustment component 114 may function to adjust probabilities only for items in collections which such collections have not been previously purchased and in a player's inventory. In this case, only newly available/unpurchased collections would have probabilities adjusted. Alternatively, probabilities may be adjusted only for collections which have previously purchased. As yet another example, probabilities may be adjusted for all collections, whether previously purchased or not yet purchased.

Various other possibilities also exist with respect to the manner in which probabilities may be adjusted by probability adjustment component 114. For example, adjustments may only be effective for a limited period of time. In this case, for example, an increased probability for receiving an item in a virtual collection may only be available for 24 hours from the time the trigger is met on a user by user basis. Alternatively, the increased probability may only be available through a day/time certain, such as an across the board expiration date of 11 am on June $3^{rd}$. In this case, for example, if the trigger is not met by that time/day, the probability enhancement will no longer be available. Alternatively, the time deadline may apply to "activation/opening" of the box as opposed to the trigger time. In this case, for example, it will be necessary for the purchaser to "open" the box and reveal contents prior to a deadline to obtain a benefit of increased probability even though the trigger had been previously met.

Other possibilities further exist with respect to restrictions that can be applied to modified distribution probabilities as implemented by probability adjustment component 114. For example, a distribution probability increase may apply only to a limited number of purchasers notwithstanding the trigger has been met globally and/or by the individual purchasing player. In this case, for example, probability adjustment component may apply the adjustment only to the first X number of players that meet the trigger (e.g. the first 5 players to purchase the $4^{th}$ instance of box A) and/or only to the first X number of players that activate/open the box (e.g. even though 10 players may have met a trigger, only the first 5 to open the box will receive the increased distribution probability opportunity). It is also possible for distribution increases to be reflected as a total number of items rather than a percentage. For example, rather than adjusting a drop rate from, say 2% to 10%, when a specific trigger is met globally (e.g. all collective players have purchased 500 of box A), the availability of item T potentially contained in box A may be increased from 2 total available to 5 total available. In this case, once the second available item T is obtained by a player, the promotion will necessarily expire.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 106, 108, 110, 112 and 114. Processor 120 may be configured to execute components 106, 108, 110, 112 and 114 by software; hardware; firmware; some combination of software, hardware, and/or firmware; and/or other mechanisms for configuring processing capabilities on processor 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112 and 114 are illustrated in FIG. 1 as being implemented within a single processing unit, in implementations in which processor 120 includes multiple processing units, one or more of components 106, 108, 110, 112 and 114 may be implemented remotely from the other components. The description of the functionality provided by the different components 106, 108, 110, 112 and 114 described above is for illustrative purposes, and is not intended to be limiting, as any of components 106, 108, 110, 112 and 114 may provide more or less functionality than is described. For example, one or more of components 106, 108, 110, 112 and 114 may be eliminated, and some or all of its functionality may be provided by other ones of components 106, 108, 110, 112 and 114. As another example, processor 120 may be configured to execute one or more additional components that may perform some or all of the functionality attributed below to one of components 106, 108, 110, 112 and 114.

Figure 2:
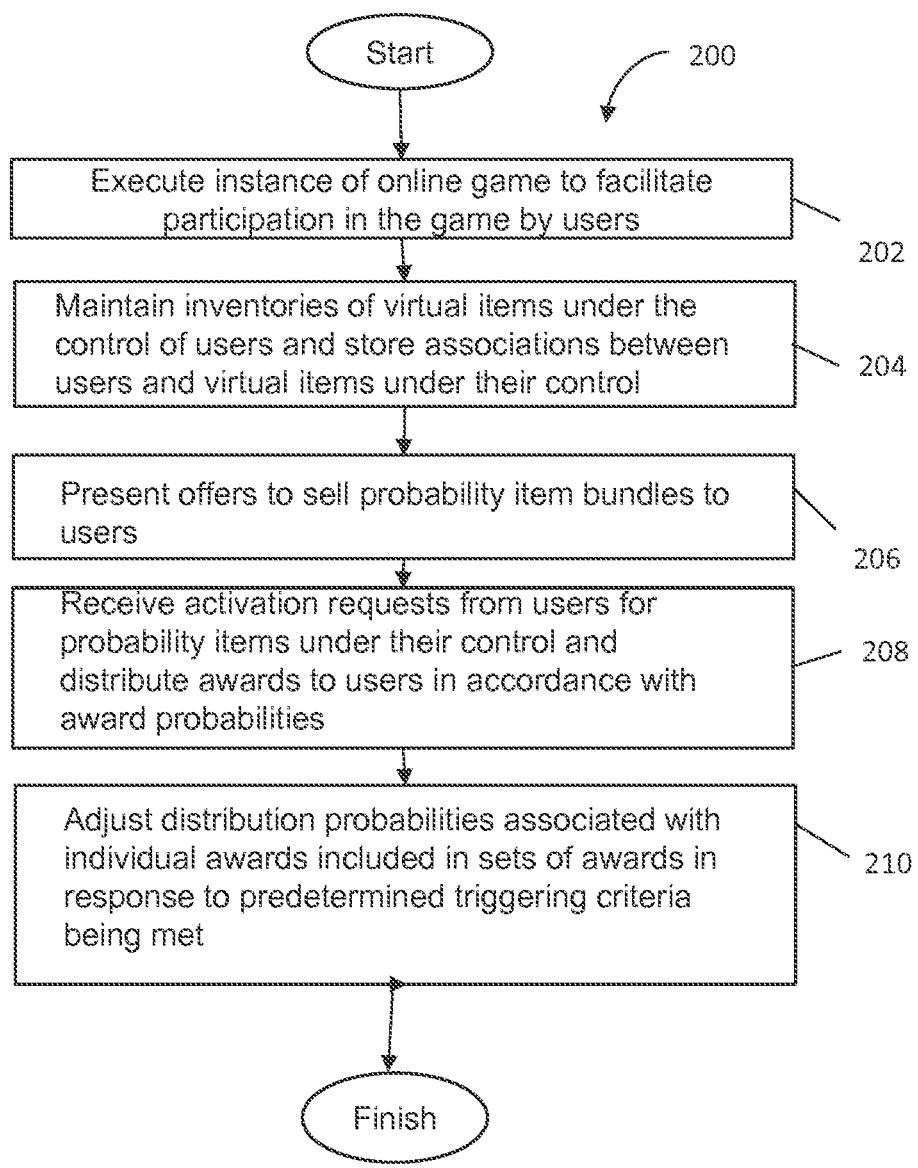
FIG. 2 illustrates a method of hosting a virtual space to client computing devices for interaction by users, including providing enhanced gameplay via adjustable and rotating drop rates associated with virtual goods.

FIG. 2 illustrates a method for promoting increased revenue opportunities though rotatable drop rates associated with virtual items usable in an online game, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of an online game may be executed to facilitate participation in the game by users. Operation 202 may be performed by a game component that is the same as or similar to game component 106, in accordance with one or more implementations.

At an operation 204, inventories of virtual items under the control of users are maintained and associated with users which control said virtual items. Operation 204 may be performed by a user component that is the same as or similar to user component 108, in accordance with one or more implementations.

At an operation 206, users are presented with others to purchase probability item bundles containing sets of virtual goods. Each of these virtual goods may have an associated distribution probability reflecting the likelihood of receiving the specific item when the set of virtual goods is purchased. Operation 206 may be performed by a shop component that is the same as or similar to shop component 110, in accordance with one or more implementations.

At an operation 208, the system receives activation requests from users for probability items under their control. In addition, in connection with this operation, these items are distributed to the requesting users in accordance with the probabilities associated with the items. Operation 208 may be performed by a probability item bundle activation component that is the same as or similar to probability item bundle activation component 112, in accordance with one or more implementations.

At an operation 210, distribution probabilities associated with virtual items which are included in sets of virtual items are adjusted. Such adjustment may typically be made by an administrator or member of a live operations teams associated with a game provider. In some embodiments, the adjustments include the setting of a trigger required to be met as a condition of the adjustment as described above. In addition, in some embodiments, the actual adjustment consists of a change to one or more distribution probabilities associated with virtual items contained within collections of virtual items. Operation 210 may be performed by a probability adjustment component that is the same as or similar to probability adjustment component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating chance-based in-game virtual item distribution of stochastically selected awards to in-game inventories of users of an online game, the system comprising:

one or more physical computer processors configured by machine readable instructions to:

execute an instance of the online game and to implement the instance of the online game to facilitate participation in the online game by the users via client computing platforms;

maintain in-game inventories of virtual items under the control of the users, wherein the in-game inventories include a first in-game inventory under the control of a first user, wherein the first in-game inventory includes one or more instances of a first probability item bundle associated with a first set of potential awards usable in the online game, the first set of potential awards including a first individual award and a second individual award, wherein the first individual award is associated with a first distribution probability and the second individual award is associated with a second distribution probability, wherein the first distribution probability dictates the chance of the first probability item bundle obtaining the first individual award upon activation by the first user, wherein the second distribution probability dictates the chance of the first probability item bundle obtaining the second individual award upon activation by the first user, wherein the one or more instances of the first probability item bundle include a first instance and a second instance;

receive a first activation request from the first user for one instance of the first probability item bundle;

responsive to the first activation request, stochastically select one of the individual potential awards from the first set of potential awards in accordance with the first and second distribution probabilities associated with the individual potential awards from the first set of potential awards;

distribute the selected individual potential award to the first in-game inventory;

adjust, in response to one or more predetermined triggering criteria being met, one or both of the first distribution probability and/or the second distribution probability, wherein the one or more predetermined triggering criteria include a level of previous purchases of the first probability item bundle by the first user breaching a purchase threshold;

receive a second activation request from the first user for the second instance of the first probability item bundle;

responsive to the second activation request, stochastically select one of the individual potential awards from the first set of potential awards in accordance with the adjusted distribution probabilities associated with the individual potential award from the first set of potential awards; and distribute the second selected individual potential awards to the first in-game inventory.

2. The system of claim 1, wherein the one or more physical processors are further configured to facilitate entry and/or selection of one or both of the one or more predetermined triggering criteria and/or the first and/or second distribution probabilities.

3. The system of claim 1, wherein adjusting the first distribution probability includes increasing the first distribution probability.

4. The system of claim 1, wherein the one or more predetermined triggering criteria further include a number of purchases within a given period of time of the first probability item bundle by a collective group of users that participate in the online game.

5. The system of claim 4, wherein adjusting the first distribution probability to a higher probability is connected with a lower level of purchases.

6. The system of claim 1, wherein the one or more predetermined triggering criteria further include a current level of inventory of the first probability item bundle held by the first user.

7. The system of claim 6, wherein adjusting the first distribution probability to a higher probability is connected with a higher level of the current level of inventory.

8. The system of claim 1, wherein the one or more predetermined triggering criteria further include a spend velocity associated with the first probability item bundle within a given period of time by a collective group of users that participate in the online game.

9. The system of claim 8, wherein adjusting the first distribution probability to higher probability is connected with a lower level of spend velocity.

10. The system of claim 1, further comprising a messaging component configured to notify users of a change in at least one of the first and second distribution probabilities.

11. The system of claim 1, wherein adjusting the first distribution probability is limited in time.

12. A computer-implemented method for facilitating chance-based in-game virtual item distribution of stochastically selected awards to in-game inventories of users of an online game, the method being implemented in a computer system that includes one or more processors executing computer program components, the method comprising:

executing an instance of the online game and implementing the instance of the online game to facilitate participation in the online game by the users via client computing platforms;

maintaining inventories of virtual items under the control of the users, wherein the in-game inventories include a first in-game inventory under the control of a first user, wherein the first in-game inventory includes one or more instances of a first probability item bundle associated with a first set of potential awards usable in the online game, the first set of potential awards including a first individual award and a second individual award, wherein the first individual award is associated with a first distribution probability and the second individual award is associated with a second distribution probability, wherein the first distribution probability dictates the chance of the first probability item bundle obtaining the first individual award upon activation by the first user, wherein the second distribution probability dictates the chance of the first probability item bundle obtaining the second individual award upon activation by the first user, wherein the one or more instances of the first probability item bundle include a first instance and a second instance;

receiving a first activation request from the first user for one instance of the first probability item bundle;

responsive to the first activation request, stochastically selecting one of the individual potential awards from the first set of potential awards in accordance with the first and second distribution probabilities associated with the individual potential awards from the first set of potential awards;

distributing the selected individual potential award to the first in-game inventory;

adjusting, in response to one or more predetermined triggering criteria being met, one or both of the first distribution probability and/or the second distribution probability, wherein the one or more predetermined triggering criteria include a level of previous purchases of the first probability item bundle by the first user breaching a purchase threshold;

receiving a second activation request from the first user for the second instance of the first probability item bundle;

responsive to the second activation request, stochastically selecting one of the individual potential awards from the first set of potential awards in accordance with the adjusted distribution probabilities associated with the individual potential awards from the first set of potential awards; and distributing the second selected individual potential award to the first in-game inventory.

13. The method of claim 12, further comprising facilitating entry and/or selection of one or both of the one or more predetermined triggering criteria and/or the first and/or second distribution probabilities.

14. The method of claim 12, wherein adjusting the first distribution probability includes increasing the first distribution probability.

15. The method of claim 12, wherein the one or more predetermined triggering criteria further include a number of purchases within a given period of time of the first probability item bundle by a collective group of users that participate in the online game.

16. The method of claim 15, adjusting the first distribution probability to a higher probability is connected with a lower level of purchases.

17. The method of claim 12, wherein the one or more predetermined triggering criteria further include a current level of inventory of the first probability item bundle held by the first user.

18. The method of claim 17, wherein adjusting the first distribution probability to a higher probability is connected with a higher level of the current level of inventory.

19. The method of claim 12, wherein the one or more predetermined triggering criteria further include a spend velocity associated with the first probability item bundle within a given period of time by a collective group of users that participate in the online game.

20. The method of claim 19, wherein adjusting the first distribution probability to higher probability is connected with a lower level of spend velocity.

21. The method of claim 12, further comprising notifying users of a change in at least one of the first and second distribution probabilities.

22. The method of claim 21, wherein adjusting the first distribution probability is limited in time.

* * * * *